Oct. 15, 1946. W. O. SCHULTZ ET AL Re 22,805

FUSE DEVICE

Original Filed April 4, 1941 4 Sheets-Sheet 1

INVENTOR.
William O. Schultz
Alvin G. Steinmayer

BY Chester W. Brown
ATTORNEY.

FUSE DEVICE

Original Filed April 4, 1941 4 Sheets-Sheet 2

INVENTOR.
William O. Schultz
Alvin H. Stemmaker
BY Chester W. Brown
ATTORNEY.

FUSE DEVICE

Original Filed April 4, 1941 4 Sheets-Sheet 3

INVENTOR.
William O. Schultz
Alvin G. Steinmayer
BY Chester W. Brown
ATTORNEY.

FUSE DEVICE

Original Filed April 4, 1941 4 Sheets-Sheet 4

INVENTOR.
William O. Schultz
Alvin H. Steinmayer

BY, Chester W. Brown
ATTORNEY.

Reissued Oct. 15, 1946

Re. 22,805

UNITED STATES PATENT OFFICE 22,805

FUSE DEVICE

William O. Schultz, South Milwaukee, and Alwin G. Steinmayer, Shorewood, Wis., assignors to Line Material Company, Milwaukee, Wis., a corporation of Delaware Original No. 2,295,015, dated September 8, 1942, Serial No. 386,779, April 4, 1941. Application for reissue January 11, 1946, Serial No. 642,458

14 Claims. (Cl. 200—114)

This invention relates to improvements in fuse devices.

It is common practice in the art to which this invention pertains to support expulsion fuse cartridges by direct mechanical engagement of each end with a terminal. Usually one of the mechanical engagements comprises a pivot at one end of the cartridge, permitting movement of the other end relative to its corresponding terminal.

It is also the practice, in some cases, to dispense with fuse cartridges and to connect fuse links directly with a pair of terminals, one of which is biased for movement away from the other and normally held in biased position by means of the fuse link.

In either case, an electric circuit is usually closed by making the last connection with the line or load side of the circuit and when the circuit is energized there is a tendency toward arcing between the connecting parts as the connection is made and vice versa.

When an expulsion cartridge is used, relatively delicate fuse link parts are protected against damage by arcing during closing or opening operations. However, when the expulsion cartridge is dispensed with, relatively delicate parts of the fuse link are brought into direct contact with live portions of the circuit and are frequently damaged sufficiently to render the fuse link mechanically weak and subject to breakage when placed under tension.

The advantages of a fuse structure in which the fuse link is enclosed in an expulsion cartridge are many and are not found in fuse structures in which expulsion cartridges are eliminated. However, in fuse structures which do not embody expulsion cartridges, it is found that simplicity in design and ease in manipulation are predominating features not present in expulsion cartridge interrupters.

Therefore, it is a primary object of this invention to provide a circuit interrupter which secures all of the advantages of both forms of fuses combined in one novel arrangement of the elements.

More specifically, an object of this invention is to provide a circuit interrupting device comprising an insulating support having a rigid terminal, an expulsion cartridge removably secured to and supported at one end only by the rigid terminal, and biasing means for drawing an arc in the cartridge and moving unfused parts of a fuse link therefrom during circuit interrupting operations.

Also an object of this invention is to provide in a fuse device having the novel characteristics of the present invention a fuse cartridge secured against removal from its mounting under reacting forces present during circuit interrupting operations, thereby obtaining a maximum interrupting capacity of the cartridge.

Another object is to provide for a fuse device having the novel characteristics of the present invention, a rigid contact adapted to cooperate with a fuse cartridge to removably hold the cartridge in a fixed direction relative to the contact during circuit interrupting operations.

A further object is to provide for a fuse device having the novel characteristics of the present invention a fuse cartridge provided at one end only with a contact adapted for connection with a rigid terminal and having a fuse link, one end of which is connected directly to a line terminal at a point remote from the tube.

It also is an object to provide for a fuse device having the novel characteristics of the present invention, means for the cartridge adapted to automatically move out of cartridge engaging position when the cartridge is moved into circuit closing position, which means normally prevents removal of the cartridge under reacting forces present during circuit interruption operation.

Yet another object is to provide a fuse device having means associated therewith whereby one end of a standard fuse link may be removably received in an expulsion cartridge and the other end processed in the field by an operator in a simple, quick, and easy manner to adapt it for connection to a terminal member.

As shown on the drawings.

Like parts are designated by the same reference numerals throughout the several views.

Figure 1:
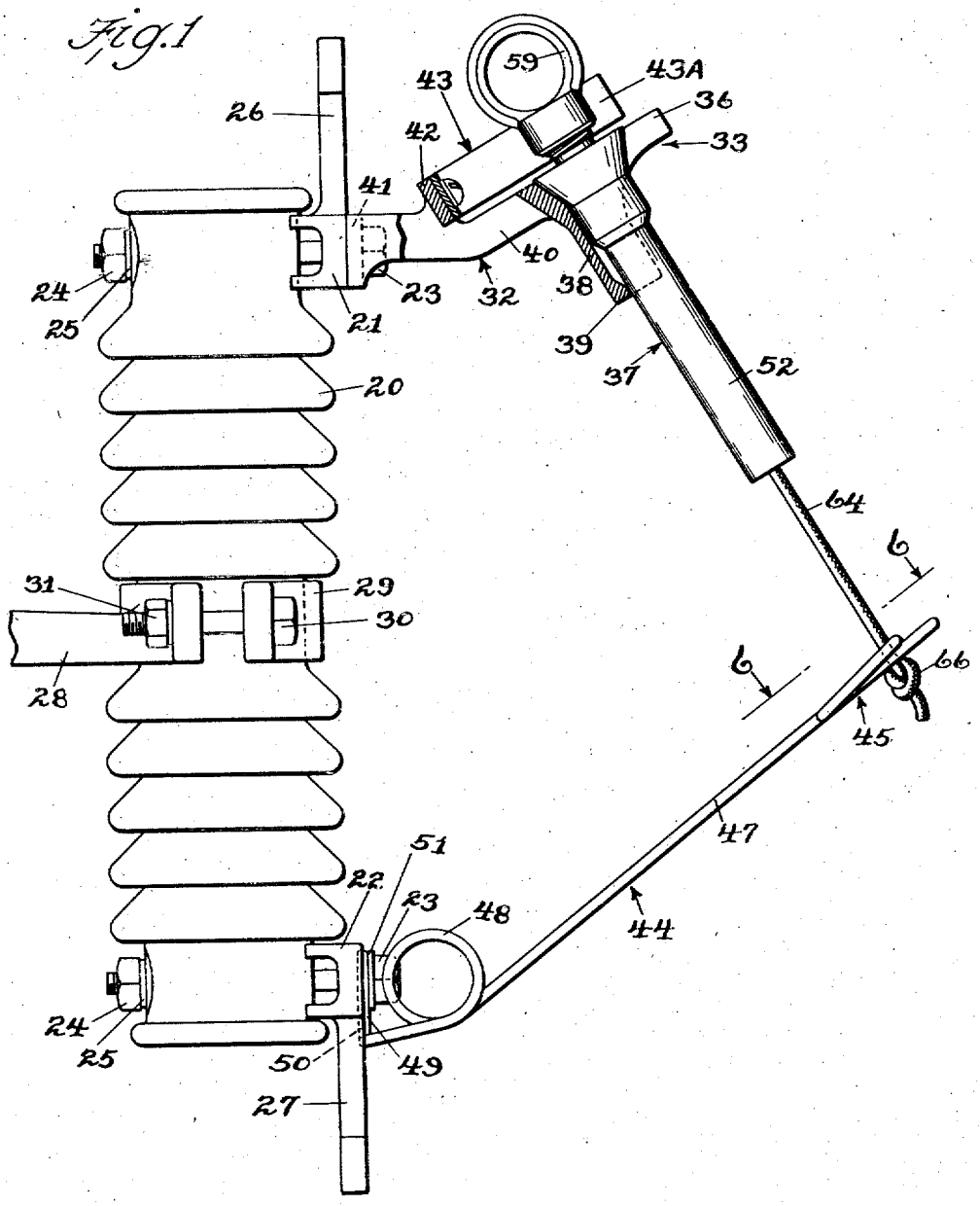
Fig. 1 is a view in side elevation, partly in section, showing a preferred form of our invention.
Figure 2:
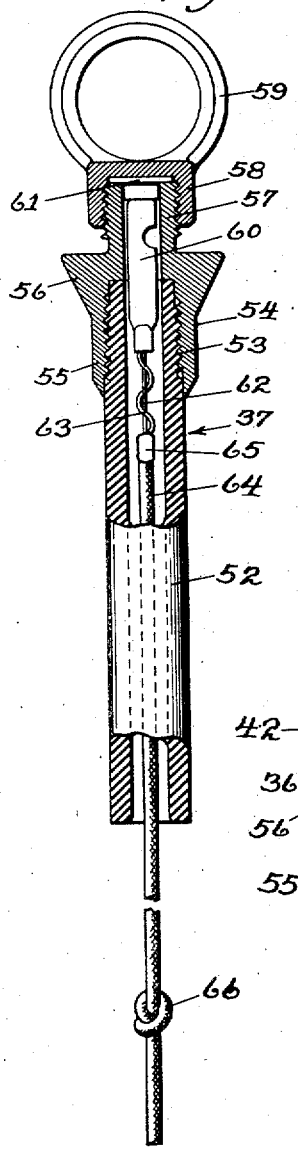
Fig. 2 is a view in side elevation, partly in section, showing the improved reloadable cartridge.

In Figs. 1 through 6 an elongated cylindrical insulator support 20 is provided with terminal members 21 and 22 mounted thereon by means of the bolts 23 which extend through the insulator 20 and are secured thereon by nuts 24 drawn tightly against the washers 25.

Extending in parallel relation to the insulator 20 are conducting portions 26 and 27 which are integral portions of the terminals 21 and 22 respectively. The conductor portions are adapted to receive electrical conductors (not shown) held in electrical relationship by means of commonly used electrical connectors (not shown).

As indicated, the support 20 is provided intermediate its ends with a hanger 28, shown fragmentarily, clamped to the support by means of the strip 29, bolts 30, and nuts 31.

Referring particularly to Figs. 1, 3, 4 and 5, the rigid contact arm 32 comprises a casting bent upwardly at its outer end and terminating in a fuse cartridge mounting means 33.

Figure 3:
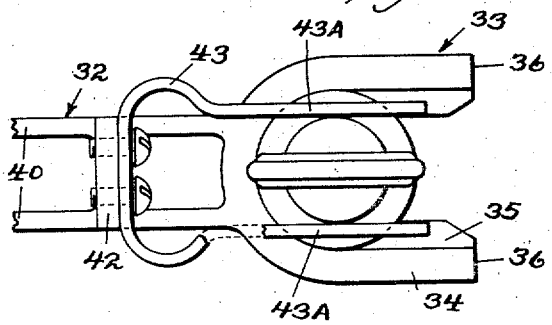
Fig. 3 is an enlarged top plan view of the reloadable cartridge and upper mounting means shown in Fig. 1.
Figure 4:
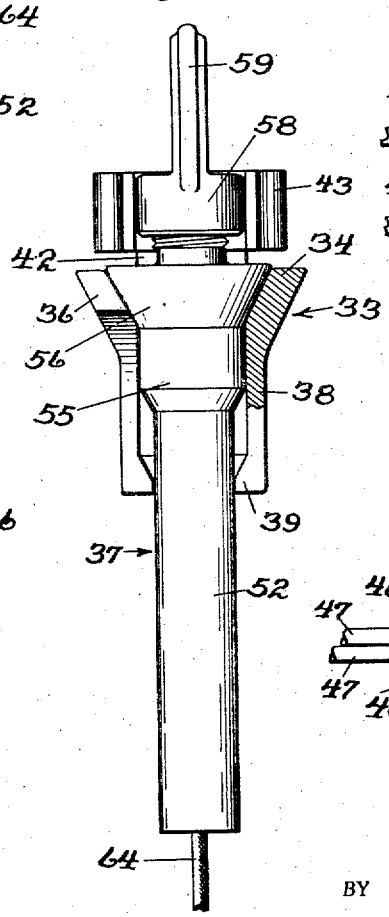
Fig. 4 is a front view of the reloadable cartridge and mounting shown in Fig. 3.
Figure 5:
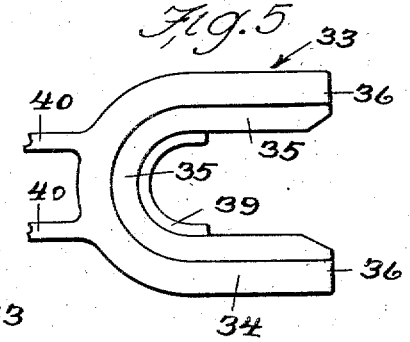
Fig. 5 is a view similar to Fig. 3 with parts removed.

The mounting means 33 includes a U-shaped contact member 34 clearly shown in Figs. 3 and 5, having an inwardly beveled contact seat 35 extending throughout the length of the member as shown. The extended sides 36 act as guides to facilitate the mounting on the member of a fuse cartridge 37 hereinafter described.

The curved or base portion of the member 33 extends downwardly in an angular direction away from the insulator 20, thereby providing a U-shaped cartridge engaging element 38 terminating in an arcuate saddle 39.

Extending rearwardly from the mounting means 33 is a pair of spaced support members 40 terminating in a base portion 41 through which the bolt 23 extends for securing the conductor arm 32 in anchored position on the terminal member 21.

A cross-rib 42 cast integral with the support members 40 and extending transversely thereof, supports a U-shaped recoil stop 43 having arms 43A. The stop is made of a flat stock, resilient material whereby the arms 43A may be biased away from each other and remain rigid normal to the biased direction.

Figure 6:
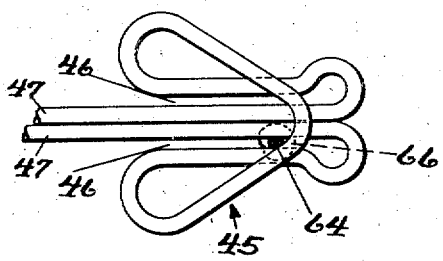
Fig. 6 is an enlarged view taken on the line 6—6 of Fig. 1.
Figure 7:
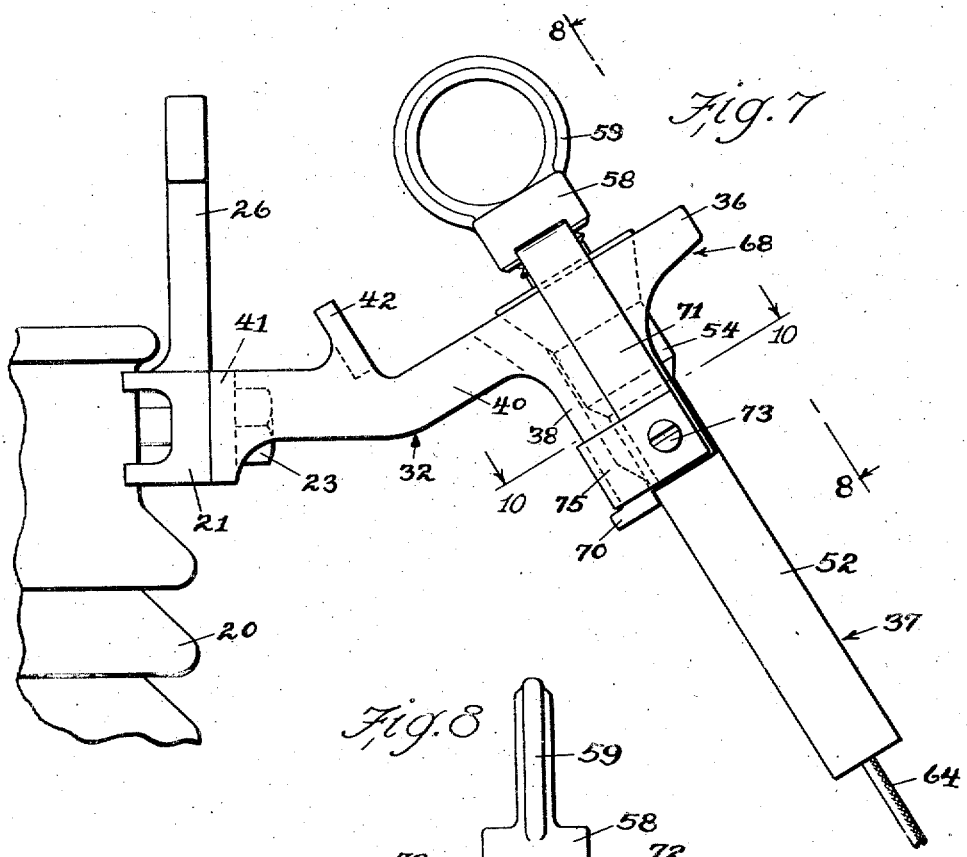
Fig. 7 is a fragmentary view, in side elevation, showing a modification of the cartridge mounting contact.
Figure 8:
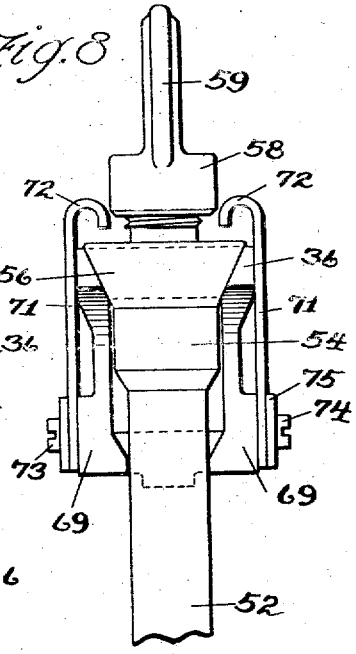
Fig. 8 is a view taken on the line 8—8 of Fig. 7.
Figure 9:
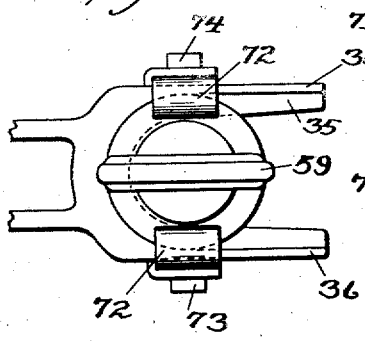
Fig. 9 is a top plan view of Fig. 8.
Figure 10:
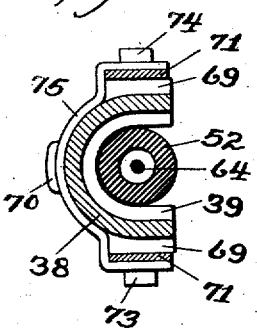
Fig. 10 is a view taken on the line 10—10 of Fig. 7.

A lower resilient contact arm 44 is formed of a continuous length of wire bent into a contact head 45, clearly shown in Fig. 6, having fuse link leader receiving slots 46. The head 45 extends rearwardly as a pair of arms 47, each terminating in a coil spring 48 and a support 49 held against the terminal member 22 in grooves 50 by the head end of the bolt 23 and the washer 51.

The fuse cartridge 37 comprises a heavy walled expulsion tube 52 made of fibre or any other suitable material adapted to provide an arc-extinguishing effect. The tube is open at the lower end and provided at the upper end with a threaded portion 53 threadedly receiving the ferrule 54.

The ferrule 54 includes a tube reinforcing portion 55 extending about the upper end of the tube and a cone-shaped contact portion 56. Above the cone-shaped contact portion 56 the ferrule extends into a threaded link supporting head 57 threadedly receiving the closure cap 58 having a mounting ring 59 integral therewith.

A standard link is received within the cartridge 37. The link comprises a terminal 60 having a contact cap 61 at the upper end and receiving a strain wire 62 and fusible wire 63 at the lower end. The strain and fusible wires are secured to a flexible leader 64 by any suitable means as solder 65.

The flexible leader 64 extends out of the open end of the expulsion tube 52 where an anchor or contact head engaging portion is provided in the leader as by looping the leader upon itself to form a knot 66.

The link is inserted in the cartridge 37 by first removing the closure cap 58 from the supporting head 57 and then mounting the link through the head 57. The contact head 61 of the link is held in contact with the head 57 by the closure cap 58. A knot 66 is provided at the free end of the leader 64 a predetermined distance from the open end of the tube 52.

With the link inserted in the fuse cartridge as described, the cartridge is mounted in circuit-closing position with the arms 32 and 44 by any convenient means as a hot line stick not shown. The prong end of the stick is inserted through the ring 59 and the leader 64 positioned in either slot 46 so that the knot 66 is adjacent the under side of the head 45, as clearly shown in Figs. 1 and 6.

Upward movement of the stick biases the arm 44 and tensions the fuse link within the cartridge. Further upward movement positions the ferrule 54 above the mounting means 33 and positions the tube 52 within the U-shaped member 34. The prong end of the stick is then withdrawn from the ring 59, permitting the cartridge to be snapped into position. As the cartridge moves to circuit closing position the cone-shaped portion 56 of the ferrule 54 forces the arms 43A apart and permits conical engagement of the portion 56 within the beveled contact seat 35.

The expulsion tube 52 is aligned by the saddle 39, and the closure cap 58 is positioned between the arms 43A of the recoil stop 43.

It may be noted that the cartridge 37 is supported by the wedge or cone-like portion 56 contacting the seat 35 and is held in a substantially fixed position relative to the contact arm 32 by means of the saddle 39 on the extended portion 38 which serves as a guide partially surrounding the tube 52.

Under heavy short circuit operating conditions considerable gas pressure is built up within the tube 52 due to the melting of the wires 62 and 63 and the resulting expanding gases. The gases escape through the open end of the tube 52 with an explosive force which tends to move the cartridge out of engagement with the mounting means 33 in a direction relative to the longitudinal axis of the cartridge.

By providing the recoil stop 43 having the arms 43A disposed in the upward path of travel of the ferrule 54, the cartridge 37 is held in position with the conductor arm 32 during circuit interrupting operation. It may be noted that external arcing at the contacts is prevented when the cartridge is held in place by means of the recoil stop 43.

The lower biased arm 44 moves downwardly away from the cartridge 37, thereby causing wide separation of the ruptured fuse link parts and an interruption of the circuit.

The device may be refused by inserting the prong end of a hot line stick in the ring 59 and moving the cartridge outwardly from the mounting means 33. The closure cap 58 is removed, a new link inserted, the cap replaced, and the cartridge mounted in circuit closing position in the manner hereinbefore described.

Figs. 7, 8, 9, and 10 show a further manner of retaining the fuse cartridge 37 in position during circuit interrupting operation. The upper contact arm 32 terminates in a mounting means 68 which is similar to the mounting means 33 described with reference to Fig. 1 except that the extension 38 is provided with a pair of mounting lugs 69 and an aligning lug 70.

A pair of elongated flat retainer members 71, each of which is resilient and provided with an inwardly bent hook portion 72, are mounted on the pins or screws 73 and 74 which are threaded into the lugs 69. The members 71 extend in parallel relation to the tube 52 and are spring pressed into normal position by means of a U-shaped spring member 75 supported by the pins 73 and 74 and the aligning lug 70.

The fuse cartridge 37 is mounted in circuit closing position in the manner described with reference to Fig. 1.

It may be noted that the hook ends of the members 71 extend into engaging alignment with the ferrule 54 and are adapted to engage the upper end of the cone-shaped contact portion 56 and hold the cartridge against removal from the contact arm 32 during circuit interrupting operation.

It may be further noted that the retainer members 71 will be spread apart by the cone-shaped portion 56 when the latter is placed above the hook portions 72 and permitted to move downwardly toward the mounting means 68, and will move back to the position illustrated after the portion 56 has passed the hook portions 72.

The cartridge is removed by means of a switch-stick and reloaded in the manner described with reference to Fig. 1.

Figs. 11 through 14 show another means for retaining a fuse cartridge in place during circuit interrupting operation.

The conductor arm 32 terminates in a mounting means 76 similar to the mounting means 33 described with reference to Fig. 1 except that the extended sides 36 each include a boss 77. The extension 38 terminates in a bail receiving portion 78 having pivot apertures 79 disposed in axial alignment with each other. Immediately above each pivot aperture 79 is an inclined surface 80 over which rides a wire bail member 81 pivotally mounted in the apertures 79, as shown.

The bail member 81 is made of any suitable resilient wire material bent to provide a pair of spaced arms 81A, each of which terminates in a pivot 82. The bail is mounted in place by spreading the arms 81A to permit insertion of the pivots 82 in the apertures 79. It may be noted that the arms 81A are bent in such a manner as to extend diagonally across the axis of the ring 90 for a purpose hereinafter described.

Stops 83 and 84 are provided adjacent the upper end of the mounting means 76 to limit the forward and rearward movement of the bail 81 when moved about the pivots 82.

Figure 11:
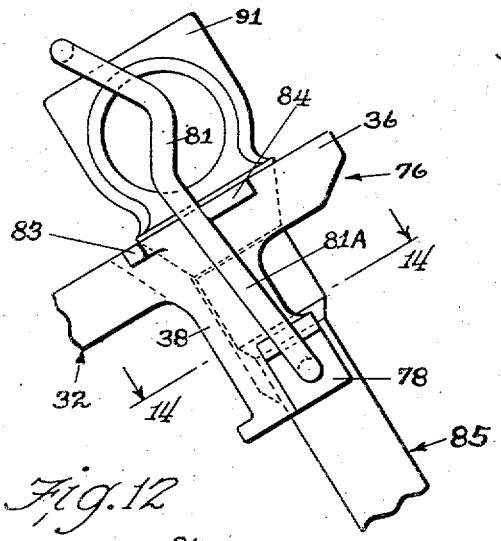
Fig. 11 is a fragmentary view, in side elevation, showing a further modification of the cartridge mounting contact.
Figure 16:
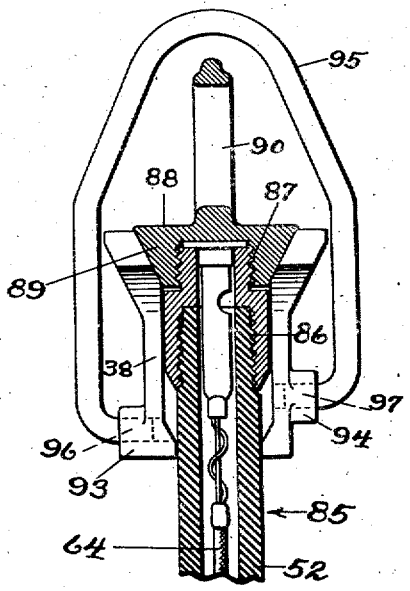
Fig. 16 is a front elevational view of Fig. 15, partly in section.
Figure 13:
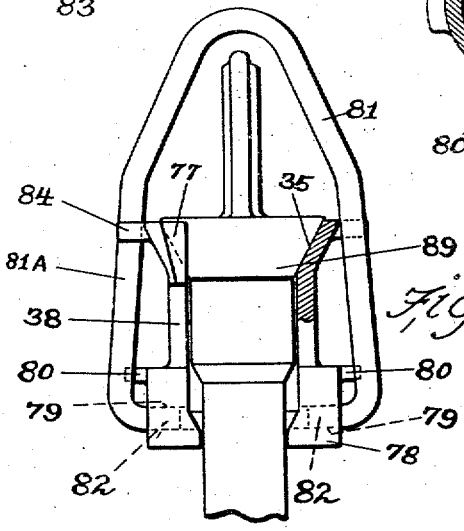
Fig. 13 is a front elevational view of Fig. 11.

Although the cartridge 37 hereinbefore described may be used with the bail construction shown in Fig. 11, it is preferable to use the cartridge construction 85 clearly shown in Fig. 16.

The cartridge 85 comprises the fibre tube 52 threadedly provided at the upper end with the ferrule 66 terminating in a link supporting head 87. A closure cap 88 is threadedly received on the head and includes a cone-shaped contact member 89 and a mounting ring 90. The mounting ring 90 includes an elongated bail engaging portion 91 adapted for a purpose hereinafter described.

The cartridge 85 is mounted in circuit closing position by means of a switch stick, the prong end of which is inserted in the ring 90. The leader 64 provided with a knot (not shown) is mounted on the lower conductor arm 44 in the manner described with reference to Fig. 1. As the cartridge is moved into position with the holding means 76, the bail 81 is moved rearwardly by the bail engaging portion 91, thereby permitting conical engagement of the contact member 89 with the beveled contact seat 35.

After the cartridge is mounted in position the bail 81 rides over the inclined surfaces 80 into its normal position against the stops 84. In this position the bail 81 prevents removal of the cartridge in an upward direction from the conductor arm 32 by engaging the portion 91 during circuit interrupting operation.

It may be noted that the two bosses 77 prevent the cartridge 85 from being removed from the mounting means 76 in a direct forward direction away from the conductor arm 32. Removal is accomplished, however, by inserting the prong end of a switch stick in the ring 90, the prong at the same time moving against the arms 81A of the bail 81, causing the bail to pivot rearwardly, thereby moving the upper end of the bail out of direct line with the cartridge. The cartridge is then raised upwardly, by means of the switch stick, sufficiently to provide clearance between the cone contact portion 89 and the bosses 77. Forward movement by the stick will remove the cartridge from the conductor arm 32. The cartridge is refused and mounted in circuit closing position in the manner hereinafter described.

Figure 15:
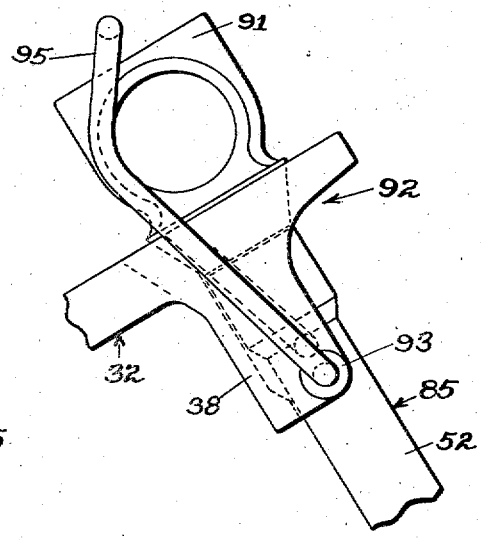
Fig. 15 is a fragmentary view, in side elevation, showing a still further modification of the cartridge mounting contact.
Figure 12:
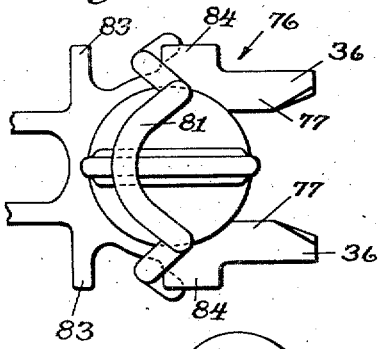
Fig. 12 is a top plan view of Fig. 11.
Figure 14:
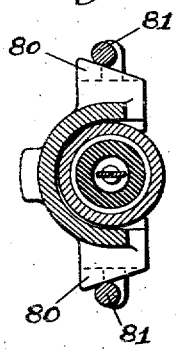
Fig. 14 is a view taken on the line 14—14 of Fig. 11.

Figs. 15 and 16 show a further means for retaining a fuse cartridge in place during circuit interrupting operation.

The mounting means 92 is similar in construction to the mounting means 76 described with reference to Fig. 11, except that the extension 38 terminates in a pair of off-center pivot bearings 93 and 94.

A U-shaped bail 95 made of resilient wire material and having pivots at 96 and 97 is pivotally mounted on the bearings 93 and 94 in a similar manner described with reference to the bail 81. The different mounting centers cause the bail 95 to assume an upright position at all times and therefore serves as an automatic lock to hold the cartridge 85 in place during short circuit operation. The cartridge is mounted in circuit closing position in the manner described with reference to Fig. 11.

The cartridge is removed from the mounting means 92 by means of a switch stick, the prong end of which is inserted in the ring 90, the cartridge then being moved forward, away from the conductor arm 32.

It may be noted that the various cartridge retaining means 43, 71, 81, and 95 operate to hold the fuse cartridge 37 or 85 in mounting position during circuit interrupting operation. Under a moderate current overload the recoil force set up within the cartridge is comparatively small and the interruption of the circuit is completed within the cartridge by the expulsion action of the tube 52 before there is any chance for an arc being drawn at the contacts. At higher current overloads the expulsive force set up within the tube 52 becomes greater, which forces the cartridge out of mounting contact position, when cartridge retaining means are not provided, before the circuit is interrupted within the tube, and thereby causes arcing at the contacts and flashover between the conductor arms 32 and 44 resulting in serious damage to the fuse device and undesirable circuit interruption operation.

By preventing removal of the cartridge from circuit mounting position, the interruption of the short circuit is completed within the tube and serious arcing prevented at the contacts, resulting in a fuse device which develops a comparatively high rupturing capacity.

It may further be noted that the rupturing capacity of the device is substantially increased by the novel arrangement of the contact parts at the upper contact which permits the use of the comparatively heavy walled expulsion tube 52 which will not readily burst under severe short circuit conditions.

From the foregoing description it is apparent that the objects of this invention have been accomplished by providing a fuse device including mounting means adapted to receive and retain a fuse cartridge in such a manner as to increase the rupturing capacity of the device and permit desirable circuit interruption operation.

We claim as our invention:

1. A fuse device comprising an insulator support, spaced conductor arms mounted on said support, mounting means associated with one of said arms, a fuse cartridge carried solely by said means and extending toward the other of said arms, a fuse link carried by said cartridge and electrically connecting said arms, and a recoil stop associated with said mounting means, said stop being disposed for engagement with said cartridge on recoil in a direction axially thereof during circuit interrupting operations and being movable out of stop engaging position to permit manual removal of said cartridge from said means, said stop being urged normally to stop engaging position.

2. A fuse device comprising an insulator support, spaced conductor arms mounted on said support, supporting means associated with one of said arms and including a cartridge alignment portion, a fuse cartridge removably supported by said means and held in a fixed position relative to said insulator support by said alignment portion, a fuse link carried by said cartridge and electrically connecting said arms, and a recoil stop associated with said mounting means, said stop being biased to stop engaging position with said cartridge and movable out of stop engaging position with said cartridge during mounting operation.

3. A fuse device comprising an insulator support, spaced conductor arms mounted on said support, supporting means associated with one of said arms and including a cartridge alignment portion, a fuse cartridge supported by said means and held in fixed angular relation to said insulator support by said alignment portion, a fuse link carried by said cartridge and electrically connecting said arms, and a stop means associated with said mounting means, said stop means being resilient in one direction of movement and substantially rigid in a direction normal to said one direction, said stop means resisting recoil movement of said cartridge and permitting movement of said cartridge past said stop means in the opposite direction.

4. A fuse device comprising an insulator support, spaced conductor arms carried by said support, a fuse cartridge removably carried solely by one of said arms and extending toward the other of said arms, a fuse link carried by said cartridge and electrically connecting said arms, and a stop means carried by said one of said arms and including an elongated resilient member extending in parallel relation to the cartridge and terminating in a hook-like portion disposed directly above said cartridge and adapted to prevent removal of said cartridge during short circuit operation.

5. A fuse device comprising an insulator support, spaced conductor arms carried by said support, one of said arms being resilient and biased away from the other by said arms, a fuse cartridge removably carried solely by said other arm, a fuse link carried by said cartridge and electrically connecting said arms, said resilient arm biasing said link in said cartridge, and a recoil stop biased to cartridge engaging position and adapted to prevent removal of said cartridge from said means on recoil of said cartridge during circuit interrupting operation, said stop being movable to permit mounting of said cartridge.

6. A fuse device comprising an insulator support, spaced conductor arms carried by said support, one of said arms being rigid and the other being resilient and biased away from said rigid arm, a mounting means associated with said rigid arm, a fuse cartridge carried solely by said means, a fuse link carried by said cartridge and electrically connecting said arms, said resilient arm biasing said link in said cartridge, and a recoil stop pivoted on said means and normally biased into cartridge engageable position whereby said cartridge is held against removal from said means during circuit interrupting operation.

7. A fuse device comprising an insulator support, spaced conductor arms mounted on said support, support means associated with one of said arms, a fuse cartridge carried solely by said means, a fuse link carried by said cartridge and electrically connecting said arms, pivot bearings on said means, a wedge member on said means above said pivots, and a resilient bail member pivotally mounted on said bearings and normally held in cartridge engageable position by said wedge member, said bail member having a portion disposed adjacent one end of said cartridge in the path of recoil thereof whereby said cartridge is held against removal from said means during circuit interrupting operation.

8. A fuse device comprising an insulator support, spaced conductor arms mounted on said support, support means associated with one of said arms, a fuse cartridge carried solely by said means, a fuse link carried by said cartridge and electrically connecting said arms, pivot bearings carried by said means and being out of axial alignment with each other, and a resilient bail member pivotally mounted on said bearings and normally held in cartridge engageable position by means of said pivots whereby said cartridge is held against removal from said means during circuit interrupting operation.

9. A fuse device comprising an insulator support, spaced conductor arms carried by said support, a U-shaped contact seat on one of said arms, a fuse cartridge solely mounted on said seat and including a ferrule having a mounting ring, pivot bearings on said one arm, a biasing element adjacent said bearings, and a bail member pivotally mounted on said bearings and normally biased into ring engageable position by said biasing element, said bail extending into the axial path of said ring so that said bail is automatically moved to inoperative position during manual cartridge removal or mounting operation.

10. A fuse device comprising an insulator support, spaced conductor arms carried by said support, one of which is resilient and normally biased away from the other, a sleeve-like fuse cartridge open at one end and provided with a terminal means at the other end, said means being adapted to removably support said cartridge solely on said other arm, a fuse link carried by said cartridge, one end of which extends from said open end of said cartridge and is attached in direct mechanical and electrical engagement with said resilient arm, whereby said link is biased in said cartridge and electrically connects said arms, said fuse cartridge sleeve having said other end formed into an extension connected to the sleeve and engageable by a stick or the like for pulling the cartridge, link, and resilient arm toward said other arm whereby the closed end of the cartridge sleeve may be retainingly and directly engaged with said other arm and said resilient arm thus placed under link biasing tension.

11. A fuse device comprising an insulator support, spaced conductor arms carried by said support, mounting means on one of said arms, a cartridge mounted solely on one of said arms, a wedge-like contact carried at the mountable end of said cartridge, and a resilient recoil stop on said means, said stop adapted to be moved to biased position by said wedge-like contact during cartridge mounting operation and to positively engage said contact during short circuit operation.

12. The combination in a fuse structure of an insulating support, a terminal member carried by said support and having a forked portion, an arm spaced from said terminal member and carried by said support, said arm being spring-biased away from said terminal member and having a free end portion, and a withdrawable self-contained fuse unit bridging said terminal member and the free end portion of said arm, said fuse unit comprising an elongated expulsion cartridge and a fuse-link, said cartridge being partially embraced by the bight of said forked portion and anchored thereby against longitudinal displacement toward said arm but withdrawable laterally from said bight, said fuse-link extending axially through said cartridge and having one end anchored therein, the other end of said fuse-link projecting beyond said cartridge and withdrawably connected directly to the free end portion of said arm, said arm being operative continuously to maintain said fuse link under tension, the bight engaging end of the cartridge being provided with a stick engageable extension for pulling the cartridge toward and into engagement with said forked portion and for effecting spring biasing of said arm to thereby place said fuse link under tension.

13. The combination in a fuse structure of an insulating support, a terminal member carried by said support and having a forked portion, an arm spaced from said terminal member and carried by said support, said arm being spring-biased away from said terminal member and having a free end portion, and a withdrawable self-contained fuse unit bridging said terminal member and the free end portion of said arm, said fuse unit comprising an expulsion cartridge and a fuse-link, said cartridge including an elongated non-conductive tube and a conductive terminus affixed to one end only of said tube, said cartridge being partially embraced by the bight of said forked portion and anchored against longitudinal displacement toward said arm by engagement of said terminus with said forked portion, said cartridge being withdrawable laterally from said bight and thereby disengageable from said terminal member, said fuse-link extending axially through said cartridge and having one end anchored therein, the other end of said fuse-link projecting beyond said cartridge and being withdrawably connected directly to the free end portion of said arm, said arm being spring-biased by the movement of said cartridge into retained engagement with the bight of said forked portion.

14. The combination in a fuse structure of an insulating support, a terminal member carried by said support and comprising a fuse unit supporting member, an arm spaced from said terminal member and carried by said support adapted to be moved toward the terminal member for biasing the arm and a fuse unit comprising an expulsion cartridge and a fuse-link, said cartridge including an elongated non-conductive tube, a tubular ferrule affixed to one end only of said tube and constituting a contact member, said ferrule being tapered externally toward the other end of said tube to effect contact and anchoring engagement with said supporting member, a removable screw cap closing the end of said ferrule, said fuse link extending axially through the bore of said cartridge and having a fusible section disposed therein, said fuse-link including a first terminal having a button head gripped between said ferrule and said screw cap and a second terminal comprising a flexible conductor projecting out of the end of said cartridge remote from said ferrule for attachment to said arm, said unit in the mounting of same being movable to engage it with said terminal member and at the same time to cause biasing of said arm to place said fuse link under tension.

WILLIAM O. SCHULTZ.
ALWIN G. STEINMAYER.